(12) United States Patent
Ni et al.

(10) Patent No.: US 11,516,400 B2
(45) Date of Patent: Nov. 29, 2022

(54) CAMERA LENS

(71) Applicant: Changzhou AAC Raytech Optronics Co., Ltd., Changzhou (CN)

(72) Inventors: Tianheng Ni, Shenzhen (CN); Rongfu Xie, Shenzhen (CN); Feng Yan, Shenzhen (CN); Gang Li, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/523,795

(22) Filed: Nov. 10, 2021

(65) Prior Publication Data

US 2022/0150411 A1    May 12, 2022

(30) Foreign Application Priority Data

Nov. 11, 2020    (CN) .......................... 202011253336.0

(51) Int. Cl.
*H04N 5/228*    (2006.01)
*H04N 5/232*    (2006.01)
*G03B 5/00*    (2021.01)
*H04N 5/225*    (2006.01)

(52) U.S. Cl.
CPC .......... *H04N 5/23287* (2013.01); *G03B 5/00* (2013.01); *H04N 5/2252* (2013.01); *H04N 5/2253* (2013.01); *G03B 2205/0007* (2013.01)

(58) Field of Classification Search
CPC ............ H04N 5/23287; H04N 5/2252; H04N 5/2253; H04N 5/2254; G03B 5/00; G03B 2205/0007; G03B 30/00; G03B 2205/0069; G02B 7/02

USPC .................................................... 348/208.11
See application file for complete search history.

(56) References Cited

U.S. PATENT DOCUMENTS

| | | | | |
|---|---|---|---|---|
| 2003/0201644 A1* | 10/2003 | Kaploun | ................... | F03D 9/25 |
| | | | | 290/43 |
| 2010/0026284 A1* | 2/2010 | Ante | ....................... | F01D 17/06 |
| | | | | 324/226 |
| 2010/0134887 A1* | 6/2010 | Shin | ....................... | G02B 27/64 |
| | | | | 359/557 |
| 2010/0195206 A1* | 8/2010 | Miyamori | ........... | H04N 5/23248 |
| | | | | 359/557 |
| 2012/0140087 A1* | 6/2012 | Ku | ...................... | H04N 5/23258 |
| | | | | 348/208.7 |

(Continued)

*Primary Examiner* — Usman A Khan
(74) *Attorney, Agent, or Firm* — W&G Law Group

(57) ABSTRACT

A camera lens includes a mounting housing, a lens module, an image stabilization module, first and second support shafts fixed to the mounting housing opposite to each other along one of diagonals of the mounting housing, and third and fourth support shafts fixed to the frame opposite to each other along another diagonal of the mounting housing. The mounting housing is formed by sequentially connecting first to fourth frame plates. The image stabilization module includes a frame, a movable frame, first and second image stabilization coils, and first and second magnets. The movable frame has first to fourth rotation holes. The first to fourth support shafts are respectively rotatably fit within the first to fourth rotation holes. The camera lens of the present disclosure can solve the problems of great process difficulty and high cost in the related art when the camera lens performs the optical image stabilization.

10 Claims, 8 Drawing Sheets

(56) References Cited

U.S. PATENT DOCUMENTS

2014/0320962 A1\* 10/2014 Ando ................... G02B 27/646
  359/557
2015/0211701 A1\* 7/2015 Chien ....................... F21V 7/00
  362/235

\* cited by examiner

B-B

CAMERA LENS

TECHNICAL FIELD

The present disclosure relates to the technical field of lenses, and in particular, to a camera lens.

BACKGROUND

An optical image stabilization (OIS) is used to avoid or compensate vibrations of an imaging instrument (i.e., camera or other similar imaging device) generated during capturing optical signals by setting an optical element such as a lens to improve imaging quality.

The camera lens in the related art employs a spherical contact rotation mode when realizing the optical image stabilization. However, such spherical contact rotation mode causes great process difficulty and high cost.

Therefore, it is necessary to provide a camera lens to overcome the above defects.

SUMMARY

An objective of the present disclosure is to provide a camera lens, which can solve the problems of great process difficulty and high cost in the related art when the camera lens performs the optical image stabilization.

In view of the above, the present disclosure provides a camera lens. The camera lens includes a mounting housing, a lens module accommodated within the mounting housing an image stabilization module for driving the lens module to rotate, a first support shaft and a second support shaft that are fixed to the mounting housing opposite to each other along one of diagonals of the mounting housing, and a third support shaft and a fourth support shaft that are fixed to the frame opposite to each other along another one of the diagonals of the mounting housing. The mounting housing is formed by sequentially connecting a first frame plate, a second frame plate, a third frame plate, and a fourth frame plate. The image stabilization module includes a frame for accommodating the lens module, a movable frame for movably suspending the frame in the mounting housing, a first image stabilization coil fixed onto the first frame plate, a second image stabilization coil fixed onto the second frame plate, a first magnet fixed onto the frame relative to the first image stabilization coil, and a second magnet fixed onto the frame relative to the second image stabilization coil. The movable frame has a first rotation hole, a second rotation hole, a third rotation hole, and a fourth rotation hole. The first support shaft is rotatably fit within the first rotation hole and the second support shaft is rotatably fit within the second rotation hole in such a manner that the movable frame is rotatable along the one of the diagonals of the mounting housing. The third support shaft is rotatably fit within the third rotation hole and the fourth support shaft is rotatably fit within the fourth rotation hole in such a manner that the frame is rotatable along the another one of the diagonals of the mounting housing.

As an improvement, the movable frame includes a limit portion located at one end of the frame, and a first movable pawl, a second movable pawl, a third movable pawl, and a fourth movable pawl that are arranged around the limit portion. The first movable pawl and the second movable pawl are opposite to each other along one of the diagonals of the mounting housing, and the third movable pawl and the fourth movable pawl are opposite to each other along another one of the diagonals of the mounting housing. The first rotation hole is provided in the first movable pawl, the second rotation hole is provided in the second movable pawl, the third rotation hole is provided in the third movable pawl, and the fourth rotation hole is provided in the fourth movable pawl.

As an improvement, the frame includes a frame body, and a first support plate and a second support plate that are spaced apart from an outer wall of the frame body. The third support shaft is fixed to the first support plate, and the third movable pawl is disposed between the outer wall of the frame body and the first support plate. The fourth support shaft is fixed to the second support plate, and the fourth movable pawl is disposed between the outer wall of the frame body and the second support plate.

As an improvement, the first support shaft includes a first fix portion fixed to the mounting housing and a first support portion received within the first rotation hole, wherein the first fix portion is arranged coaxially with the first support portion and has a radius greater than a radius of the first rotation hole. The second support shaft includes a second fix portion fixed to the mounting housing and a second support portion received within the second rotation hole, wherein the second fix portion is arranged coaxially with the second support portion and has a radius greater than a radius of the second rotation hole. The third support shaft includes a third fix portion fixed to the first support plate and a third support portion received within the third rotation hole, wherein the third fix portion is arranged coaxially with the third support portion and has a radius greater than a radius of the third rotation hole. The fourth support shaft includes a fourth fix portion fixed to the second support plate and a fourth support portion received within the fourth rotation hole, wherein the fourth fix portion is arranged coaxially with the fourth support portion and has a radius greater than a radius of the fourth rotation hole.

As an improvement, an end of the first fix portion close to the first movable pawl protrudes from the mounting housing, and an end of the second fix portion close to the second movable pawl protrudes from the mounting housing. An end of the third fix portion close to the third movable pawl protrudes from the first support plate, and an end of the fourth fix portion close to the fourth movable pawl protrudes from the second support plate.

As an improvement, the first movable pawl is spaced apart from the first fix portion, and the second movable pawl is spaced apart from the second fix portion. The third movable pawl is spaced apart from each of the third fix portion and the outer wall of the frame body, and the fourth movable pawl is spaced apart from each of the fourth fix portion and the outer wall of the frame body.

As an improvement, the first support portion has a central axis coincident with a central axis of the second support portion, and the third support portion has a central axis coincident with a central axis of the fourth support portion.

As an improvement, the first support portion penetrates through the first rotation hole, the second support portion penetrates through the second rotation hole, the third support portion penetrates through the third rotation hole, and the fourth support portion penetrates through the fourth rotation hole.

As an improvement, a first receiving hole corresponding to the third support portion and a second receiving hole corresponding to the fourth support portion are provided in the frame body, the third support portion is inserted into the first receiving hole, and the fourth support portion is inserted into the second receiving hole.

As an improvement, the first support portion has a diameter equal to a diameter of the first rotation hole, the second support portion has a diameter equal to a diameter of the second rotation hole, the third support portion has a diameter equal to a diameter of the third rotation hole, and the fourth support portion has a diameter equal to a diameter of the fourth rotation hole.

In the present disclosure, the first support shaft and the second support shaft are fixed to the mounting housing opposite to each other along one of the diagonals of the mounting housing, the third support shaft and the fourth support shaft are fixed to the frame opposite to each other along another diagonal of the mounting housing, the first support shaft is rotatably fit within the first rotation hole of the movable frame, the second support shaft is rotatably fit within the second rotation hole of the movable frame, the third support shaft is rotatably fit within the third rotation hole of the movable frame, and the fourth supporting shaft is rotatably fit within the fourth rotation hole of the movable frame. In this way, the movable frame can rotate along one of the diagonals of the mounting housing relative thereto by the cooperation of the first image stabilization coil with the first magnet and the cooperation of the second image stabilization coil with the second magnet, and the frame can rotate along another diagonal of the mounting housing relative to the movable frame by the cooperation of the first image stabilization coil with the first magnet and the cooperation of the second image stabilization coil with the second magnet. In the present disclosure, the first support shaft is fit within the first rotation hole, the second support shaft is fit within the second rotation hole, the third support shaft is fit within the third rotation hole, and the fourth support shaft is fit within the fourth rotation hole, so that the lens module can be driven by the frame and the movable frame to rotate in different degrees of freedom, which solves the problems of great process difficulty and high cost in the related art when the camera lens performs the optical image stabilization.

Figure 1:
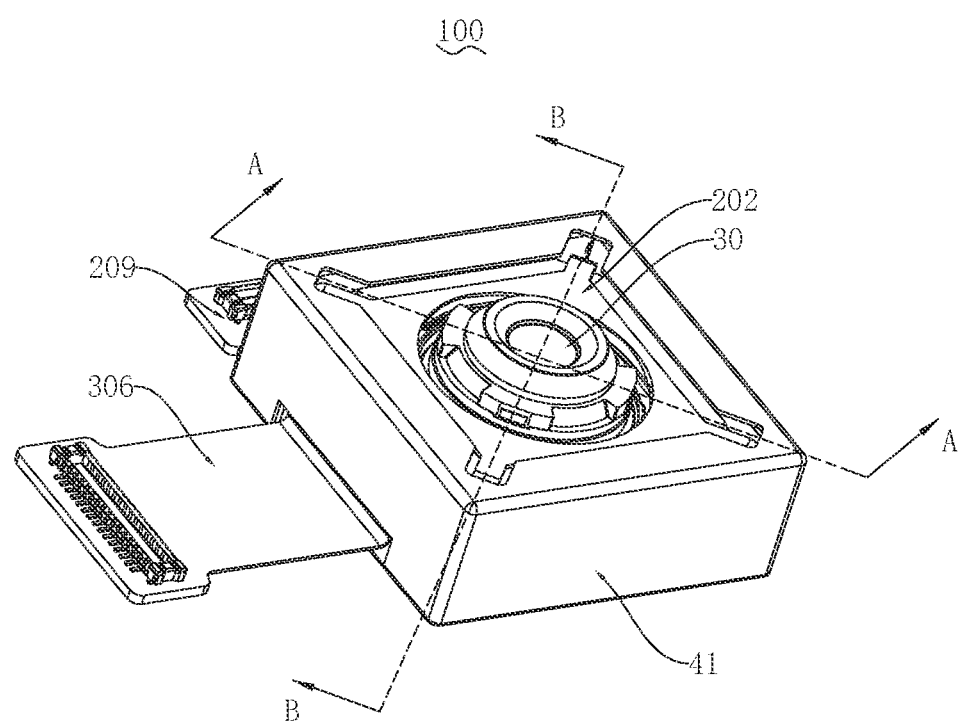
FIG. 1 is an overall schematic diagram of a camera lens according to an embodiment of the present disclosure.

DESCRIPTION OF REFERENCE NUMERALS 100. camera lens;
10. mounting housing; 10a. mounting recess; 10b. first limit slot; 10c. second limit slot;
11. first frame plate; 111. first opening;
12. second frame plate 121. second opening;
13. third frame plate;
14. fourth frame plate;
20. image stabilization module;
201. frame; 201a. third opening; 201b. fourth opening;
2011. frame body; 2011a. first receiving hole; 2011b. second receiving hole;
2012. first support plate; 2012a. the third limit slot;
2013. second support plate; 2013a. fourth limit slot;
202. movable frame;
2021. limit portion;
2022. first movable pawl; 2022a. first rotation hole;
2023. second movable pawl; 2023a. second rotation hole;
2024. third movable pawl; 2024a. third rotation hole;
2025. fourth movable pawl; 2025a. fourth rotation hole;
203. first image stabilization coil;
204. second image stabilization coil;
205. first magnet;
206. second magnet;
207. first support shaft; 2071a. first fix portion; 2072. first support portion;
208. second support shaft; 2081. second fix portion; 2082. second support portion;
209. image stabilization circuit board;
210. first magnetic conductive plate;
211. second magnetic conductive plate;
212. third support shaft; 2121. third fix portion; 2122. third support portion;
213. fourth support shaft; 2131. fourth fix portion; 2132. fourth support portion;
30. lens module;
301. lens;
302. lens holder;
303. infrared filter;
304. support base;
305. imaging sensor;
306. focusing circuit board;
41. housing;
42. bottom plate.

DESCRIPTION OF EMBODIMENTS

The present disclosure will be described more fully below with reference to the accompanying drawings. The embodiments of the present disclosure are shown in the drawings. However, the present disclosure can be implemented in many other different forms, and is not limited to the embodiments described herein. On the contrary, these embodiments are merely provided to make more thorough and comprehensive understanding of the present disclosure.

It should be noted that when an element is referred to as being "fixed to" another element, it can be directly on the other element, or there is an intermediate element therebetween. When an element is referred to as being "connected" to another element, it can be directly connected to the other element, or there is an intermediate element therebetween. The terms "vertical", "horizontal", "left", "right" and other similar expressions used herein are merely illustrative.

All technical and scientific terms used herein have the same meaning as commonly understood by those skilled in the art of the present disclosure, unless otherwise defined. The terms used in the description of the present disclosure herein are merely for the purpose of describing specific embodiments, and are not intended to limit the present disclosure. The term "and/or" as used herein includes any and all combinations of one or more related listed items.

Referring to FIGS. 1 to 8, a camera lens 100 is provided and includes a mounting housing 10, a lens module 30 accommodated within the mounting housing 10, and an image stabilization module 20 configured to drive the lens module 30 to rotate.

The mounting housing 10 is formed by sequentially connecting a first frame plate 11, a second frame plate 12, a third frame plate 13, and a fourth frame plate 14. The image stabilization module 20 includes a frame 201 for accommodating the lens module 30 therein, a movable frame 202 for movably suspending the frame 201 in the mounting housing 10, a first image stabilization coil 203 fixed onto the first frame plate 11, a second image stabilization coil 204 fixed onto the second frame plate 12, a first magnet 205 fixed onto the frame 201 relative to the first image stabilization coil 203, and a second magnet 206 fixed onto the frame 201 relative to the second image stabilization coil 204.

The image stabilization module 20 further includes a first support shaft 207 and a second support shaft 208 that are fixed to the mounting housing 10 opposite to each other along one of diagonals of the mounting housing 10, and a third support shaft 212 and a fourth support shaft 213 that are fixed to the frame 201 opposite to each other along the other diagonal of the mounting housing 10. The movable frame 202 has a first rotation hole 2022a, a second rotation hole 2023a, a third rotation hole 2024a, and a fourth rotation hole 2025a. The first support shaft 207 is rotatably fit within the first rotation hole 2022a, and the second support shaft 208 is rotatably fit within the second rotation hole 2023a, so that the movable frame 202 is rotatable along one of the diagonals of the mounting housing 10. The third support shaft 212 is rotatably fit within the third rotation hole 2024a, and the fourth support shaft 213 is rotatably fit within the fourth rotation hole 2025a, so that the frame 201 is rotatable along another diagonal of the mounting housing 10.

In some embodiments of the present disclosure, the first support shaft 207 and the second support shaft 208 are fixed to the frame 201 opposite to each other along one of the diagonals of the mounting housing 10, the third support shaft 212 and the fourth support shaft 213 are fixed to the frame 201 opposite to each other along another diagonal of the mounting housing 10, the first support shaft 207 is rotatably fit within the first rotation hole 2022a of the movable frame 202, the second support shaft 208 is rotatably fit within the movable frame 202, the third support shaft 212 is rotatably fit within the third rotation hole 2024a of the movable frame 202, and the fourth support shaft 213 is rotatably fit within the fourth rotation hole 2025a of the movable frame 202. In this way, the movable frame 202 can rotate along one of the diagonals of the mounting housing 10 relative thereto by the cooperation of the first image stabilization coil 203 with the first magnet 205 and the cooperation of the second image stabilization coil 204 with the second magnet 206, and the frame 201 can rotate along another diagonal of the mounting housing 10 relative to the movable frame 202 by the cooperation of the first image stabilization coil 203 with the first magnet 205 and the cooperation of the second image stabilization coil 204 with the second magnet 206. In the embodiment, the first support shaft 207 is fit within the first rotation hole 2022a, the second support shaft 208 is fit within the second rotation hole 2023a, the third support shaft 212 is fit within the third rotation hole 2024a, and the fourth support shaft 213 is fit within the fourth rotation hole 2025a, so that the lens module 30 is driven by the frame 201 and the movable frame 202 so as to rotate with different degrees of freedom, which solves the problems of great process difficulty and high cost in the related art when the camera lens 100 performs the optical image stabilization.

Figure 4:
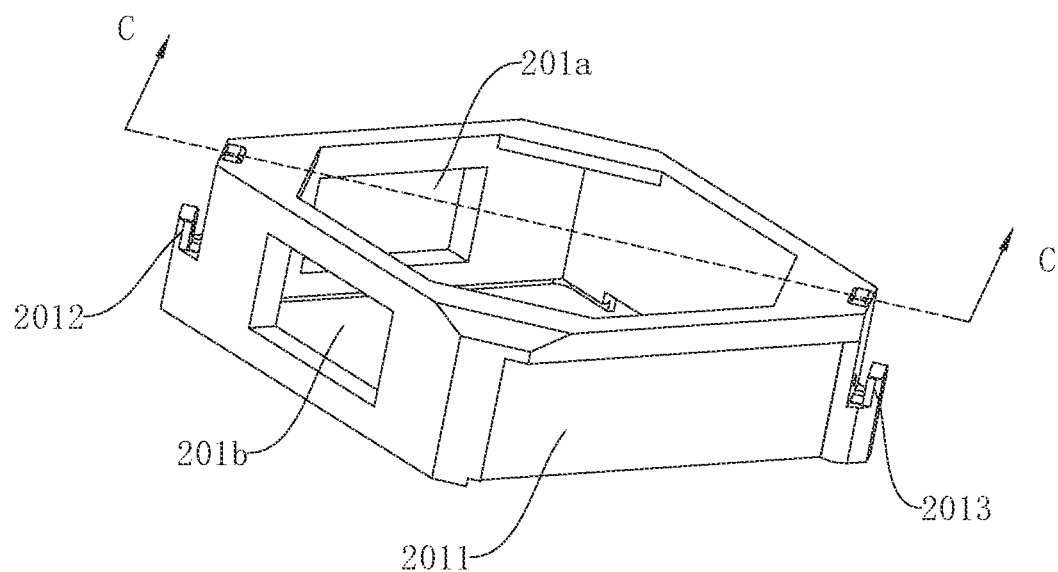
FIG. 4 is a schematic diagram of a frame.
Figure 6:
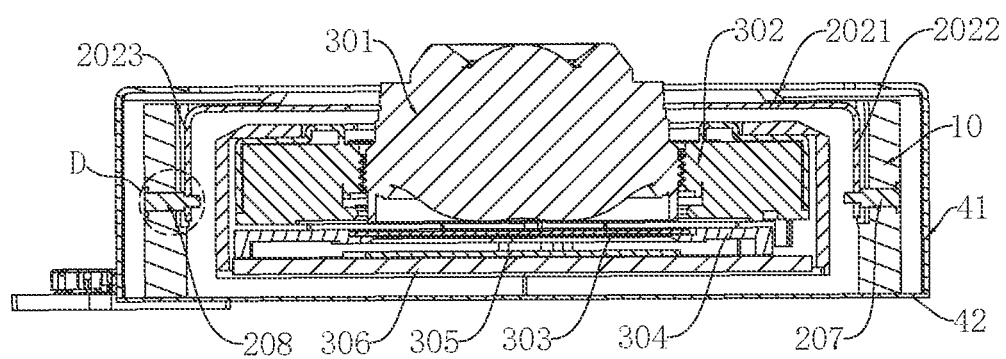
FIG. 6 is a cross-sectional view along line A-A shown in FIG. 1.
Figure 7:
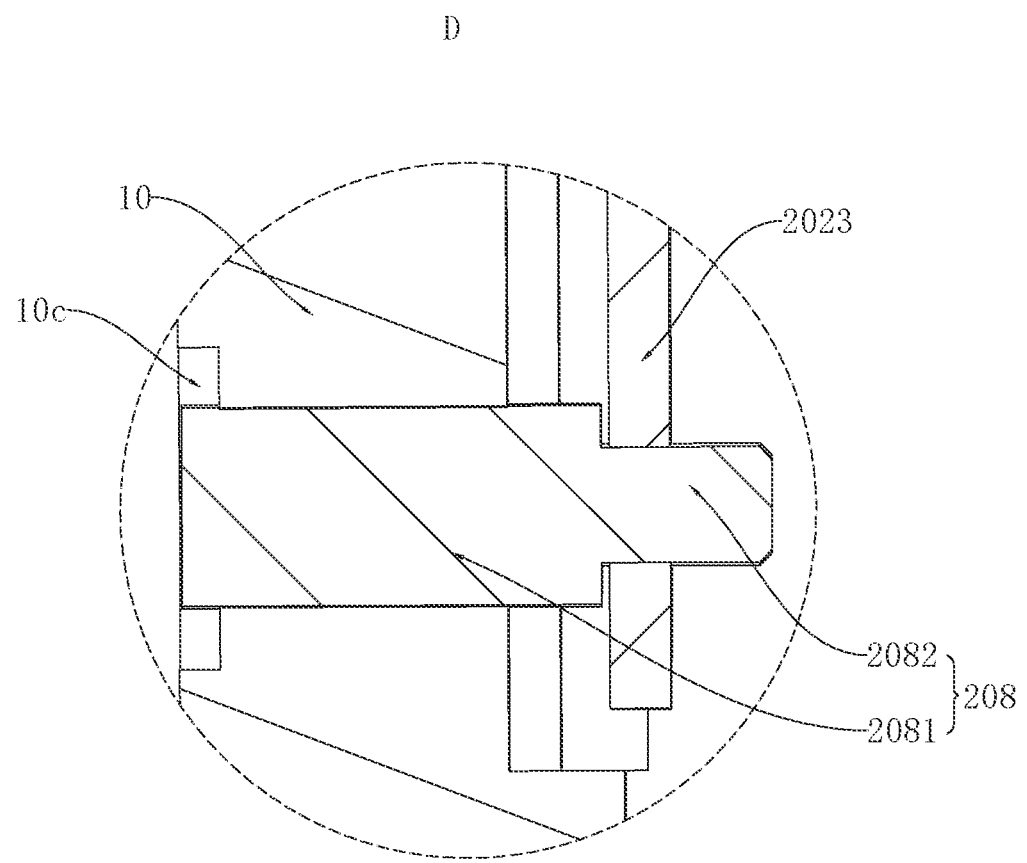
FIG. 7 is a partial enlarged view of a camera lens at D shown in FIG. 6.
Figure 8:
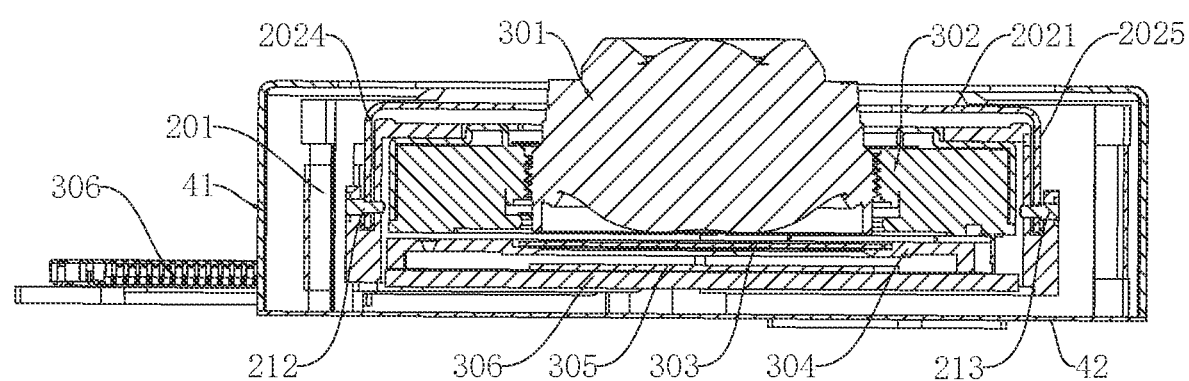
FIG. 8 is a cross-sectional view along line B-B shown in FIG. 1.

Referring to FIG. 4, FIG. 6 and FIG. 8, the movable frame 202 includes a limit portion 2021 located at one end of the frame 201, and a first movable pawl 2022, a second movable pawl 2023, a third movable pawl 2024 and a fourth movable pawl 2025 that are arranged around the limit portion 2021. The first movable pawl 2022 and the second movable pawl 2023 are arranged opposite to each other along one of the diagonals of the mounting housing 10, and the third movable pawl 2024 and the fourth movable pawl 2025 are arranged opposite to each other along another diagonal of the mounting housing 10. The first movable pawl 2022 is formed with a first rotation hole 2022a, the second movable pawl 2023 is formed with a second rotation hole 2023a, the third movable pawl 2024 is formed with a third rotation hole 2024a, and the fourth movable pawl 2025 is formed with a fourth rotation hole 2025a.

Figure 3:
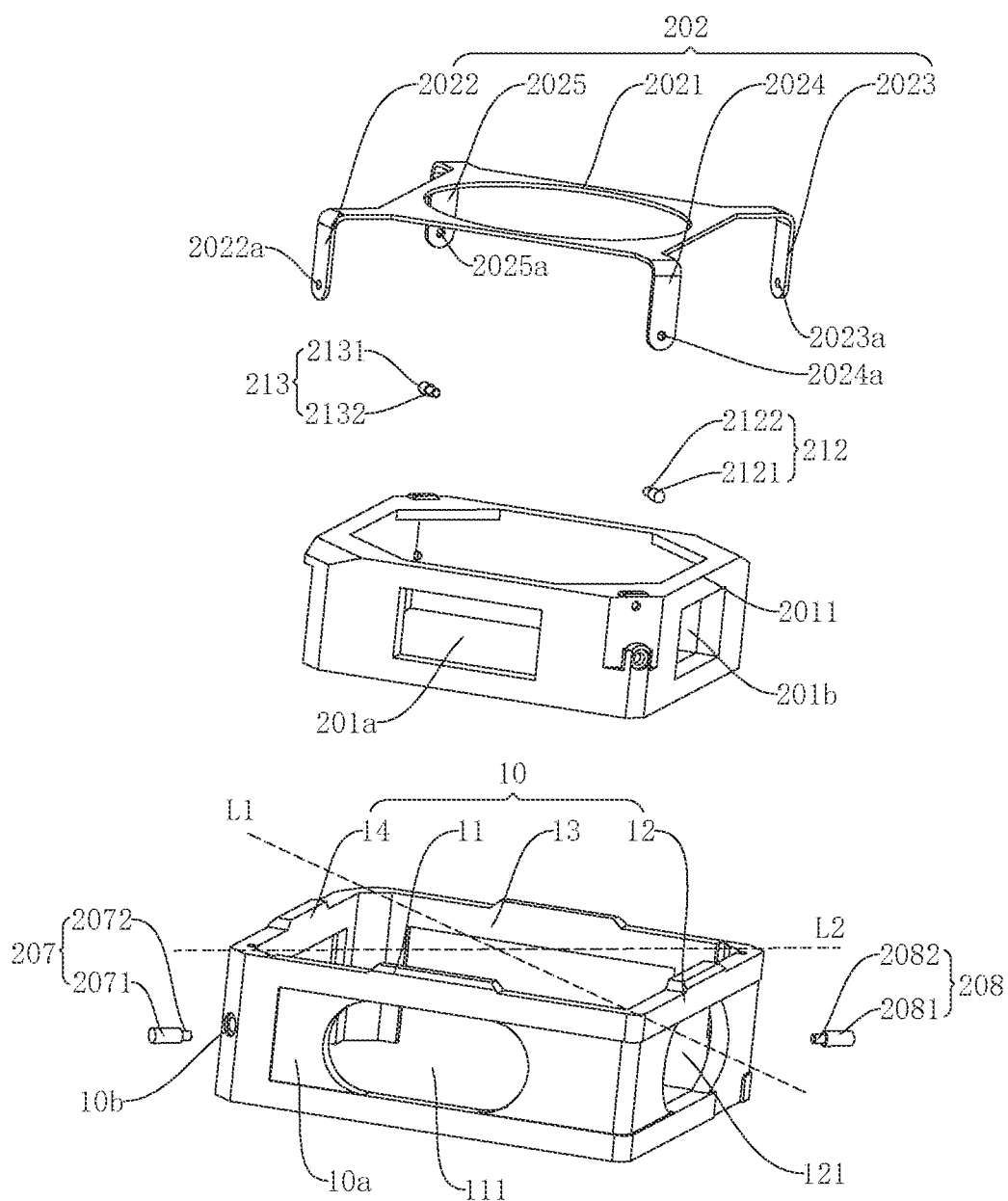
FIG. 3 is a partial schematic diagram of a camera lens according to an embodiment of the present disclosure.

Referring to FIG. 3, the mounting housing 10 has a first diagonal L1 and a second diagonal L2. The first diagonal L1 extends from a connection of the first frame plate 11 and the second frame plate 12 toward a connection of the third frame plate 13 and the fourth frame plate 14, and the second diagonal L2 extends from a connection of the first frame plate 11 and the fourth frame plate 14 toward a connection of the second frame plate 12 and the third frame plate 13.

In some embodiments of the present disclosure, the first movable pawl 2022 and the second movable pawl 2023 are opposite to each other along the second diagonal L2 of the mounting housing 10, and the third movable pawl 2024 and the fourth movable pawl 2025 are opposite to each other along the first diagonal L1 of the mounting housing 10.

When a current flows through each of the first image stabilization coil 203 and the second image stabilization coil 204 in a counterclockwise direction or a clockwise direction, the first movable pawl 2022 and the second movable pawl 2023 rotate relative to the first support shaft 207 and the second support shaft 208, respectively, that is, the movable frame 202 rotates relative to the mounting housing 10, thereby driving the lens module 30 to rotate relative to the mounting housing 10 along the second diagonal L2. When the current flows through the first image stabilization coil 203 in the clockwise direction and through the second image stabilization coil 204 in the counterclockwise direction, or when the current flows through the first image stabilization coil 203 in the counterclockwise direction and through the second image stabilization coil 204 in the clockwise direction, the frame 201 rotates relative to the third movable pawl 2024 and the fourth movable pawl 2025, that is, the frame 201 rotates relative to the movable frame 202, thereby driving the lens module 30 to rotate relative to the mounting housing 10 along the first diagonal L1. The lens module 30 is controlled by the cooperation of the first image stabilization coil 203 with the first magnet 205 and the cooperation of the second image stabilization coil 204 with the second magnet 206 to rotate along the first diagonal L1 or the second diagonal L2 to compensate an amount of movement of an external vibration, so as to realize the optical image stabilization function of the lens module 30 to keep an optical path stable to improve an image quality.

Figure 2:
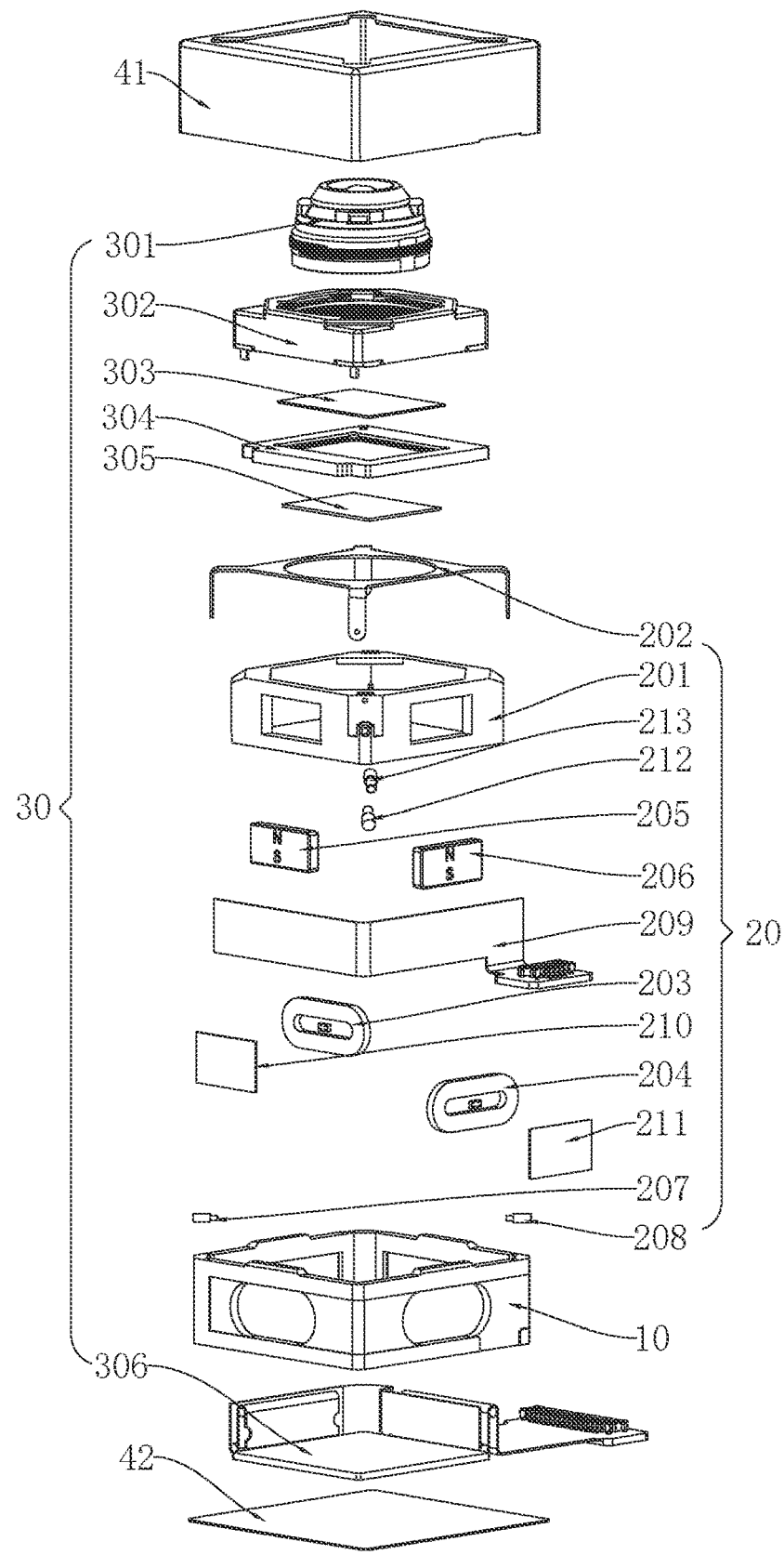
FIG. 2 is a exploded schematic diagram of the camera lens shown in FIG. 1.

With reference to FIG. 2 and FIG. 3, the first frame plate 11 is formed with a first opening 111 in which the first image stabilization coil 203 is fit, the second frame plate 12 is formed with a second opening 111 in which the second image stabilization coil 204 is fit, and the frame 201 is formed with a third opening 201a in which the first magnet 205 is fit and a fourth opening 201b in which the second magnet 206 is fit. The image stabilization module 20 further includes an image stabilization circuit board 209, a first magnetic conductive plate 210, and a second magnetic conductive plate 211. A mounting recess 10a is formed on an outer wall surface of the mounting housing 10, and the first opening 111 and the second opening 121 penetrate through a bottom of the mounting recess 10a. The image stabilization circuit board 209 is disposed in the mounting recess 10a to be electrically connected to the first image stabilization coil 203 and the second image stabilization coil 204. The first magnetic conductive plate 210 is disposed on a side of the image stabilization circuit board 209 away from the first image stabilization coil 203, and the second magnetic conductive plate 211 is disposed on a side of the image stabilization circuit board 209 away from the second image stabilization coil 204.

Figure 5:
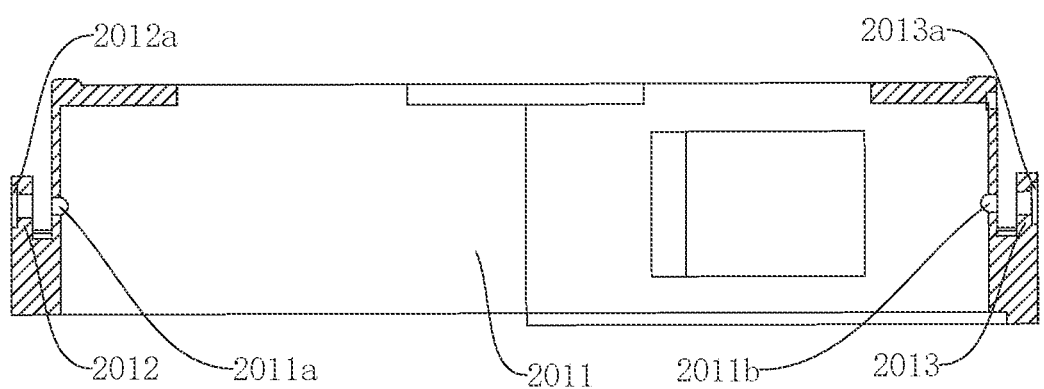
FIG. 5 is a cross-sectional view along line C-C shown in FIG. 4

Referring to FIG. 4, FIG. 5 and FIG. 8, in some embodiments of the present disclosure, the frame 201 includes a frame body 2011, and a first support plate 2012 and a second support plate 2013 that are spaced apart from an outer wall of the frame body 2011. The third support shaft 212 is fixed to the first support plate 2012, and the third movable pawl 2024 is disposed between the outer wall of the frame body 2011 and the first support plate 2012, so that the third movable pawl 2024 is prevented from being separated during an rotation of the third movable pawl 2024 relative to the third support shaft 212. The fourth support shaft 213 is fixed to the second support plate 2013, and the fourth movable pawl 2025 is disposed between the outer wall of the frame body 2011 and the second support plate 2013, so that the four movable pawl 2025 is prevented from being separated during an rotation of the fourth movable pawl 2025 relative to the fourth support shaft 213.

Referring to FIG. 3 to FIG. 8, in some embodiments of the present disclosure, the first support shaft 207 includes a first fix portion 2071 fixed to the mounting housing 10 and a first support portion 2072 received within the first rotation hole 2022a. The fix portion 2071 is arranged coaxially with the first support portion 2072 and has a radius greater than a radius of the first rotation hole 2022a. Therefore, the first movable pawl 2022 provided on the first support portion 2072 is limited by an end face of the first fix portion 2071 so as to prevent particles from being generated due to a friction between the first movable pawl 2022 and the mounting housing 10 during the rotation of the first movable pawl 2022.

The second support shaft 208 includes a second fix portion 2081 fixed to the mounting housing 10 and a second support portion 2082 received within the second rotation hole 2023a. The second fix portion 2081 is arranged coaxially with the second support portion 2082 and has a radius greater than a radius of the second rotation hole 2023a. Therefore, the second movable pawl 2023 provided on the second support portion 2082 is limited by an end face of the second fix portion 2081 so as to prevent particles from being generated due to a friction between the second movable pawl 2023 and the frame 201 during the rotation of the second movable pawl 2023.

The third support shaft 212 includes a third fix portion 2121 fixed to the first support plate 2012 and a third support portion 2122 received within the third rotation hole 2024a. The third fix portion 2121 is arranged coaxially with the third support portion 2122 and has a radius greater than a radius of the third rotation hole 2024a. Therefore, the third movable pawl 2024 provided on the third support portion 2122 is limited by an end face of the third fix portion 2121 so as to prevent particles from being generated due to a friction between the third movable pawl 2024 and the frame 201 during the rotation of the third movable pawl 2024.

The fourth support shaft 213 includes a fourth fix portion 2131 fixed to the second support plate 2013 and a fourth support portion 2132 received within the fourth rotation hole 2025a. The fourth fix portion 2131 is arranged coaxially with the fourth support portion 2132 and has a radius greater than a radius of the fourth rotation hole 2025a. Therefore, the fourth movable pawl 2025 provided on the fourth support portion 2132 is limited by an end face of the fourth fix portion 2131 so as to prevent particles from being generated due to a friction between the fourth movable pawl 2025 and the frame 201 during the rotation of the fourth movable pawl 2025.

In some embodiments of the present disclosure, an end of the first fix portion 2071 close to the first movable pawl 2022 protrudes from the mounting housing 10, and an end of the second fix portion 2081 close to the second movable pawl 2023 protrudes from the mounting housing 10. A protruding length of the first fix portion 2071 from the mounting housing 10 allows the mounting housing 10 to be spaced apart from the first movable pawl 2022 by a predetermined distance, and a protruding length of the second fix portion 2081 from the mounting housing 10 allow the mounting housing 10 to be spaced apart from the first movable pawl 2022 by a predetermined distance. In this way, it is possible to ensure that no friction is generated between the mounting housing 10 and each of the first movable pawl 2022 and the second movable pawl 2023.

In some embodiments of the present disclosure, an end of the third fix portion 2121 close to the third movable pawl 2024 protrudes from the first support plate 2012, and an end of the fourth fix portion 2131 close to the fourth movable pawl 2025 protrudes from the second support plate 2013. A protruding length of the third fix portion 2121 from the first support plate 2012 allows the first support plate 2012 to be spaced apart from the third movable pawl 2024 by a predetermined distance, and a protruding length of the fourth fix portion 2131 from the second support plate 2013 allows the second support plate 2013 to be spaced apart from the fourth movable pawl 2025 by a predetermined distance. In this way, it is possible to further ensure that no friction is generated between the frame 201 and each of the third movable pawl 2024 and the fourth movable pawl 2025.

The first movable pawl 2022 is spaced apart from the first fix portion 2071, so that no frication is generated between the first movable pawl 2022 and an end surface of the first fix portion 2071 during the rotation of the first movable pawl 2022. The second movable pawl 2023 is arranged to be spaced apart from the second fix portion 2081, so that no frication is generated between the second movable pawl 2023 and an end surface of the second fix portion 2081 during the rotation of the second movable pawl 2023.

The third movable pawl 2024 is spaced apart from each of the third fix portion 2121 and the outer wall of the frame body 2011, so that no frication is generated between the third movable pawl 2024 and each of the end surface of the third fix portion 2121 and the outer wall of the frame body 2011 during the rotation of the third movable pawl 2024. The fourth movable pawl 2025 is spaced apart from each of the fourth fix portion 2131 and the outer wall of the frame body 2011, so that no frication is generated between the fourth movable pawl 2025 and each of the end surface of the fourth fix portion 2131 and the outer wall of the frame body 2011 during the rotation of the fourth movable pawl 2025.

In some embodiments of the present disclosure, the first support portion 2072 has a central axis coincident with a central axis of the second support portion 2082 to improve stability of the rotation of the first movable pawl 2022 relative to the first support portion 2072 and stability of the rotation of the second movable pawl 2023 relative to the second support portion 2082.

The third support portion 2122 has a central axis coincident with a central axis of the fourth support portion 2132 to improve stability of the rotation of the third movable pawl 2024 relative to the third support portion 2122 and stability of the rotation of the fourth movable pawl 2025 relative to the fourth support portion 2132.

In some embodiments of the present disclosure, the first support portion 2072 penetrates through the first rotation hole 2022a to ensure that the first movable pawl 2022 is always stably supported by the first support portion 2072 when rotating. The second support portion 2082 penetrates through the second rotation hole 2023a to ensure that the second movable pawl 2023 is always stably supported by the second support portion 2082 when rotating.

The third support portion 2122 penetrates through the third rotation hole 2024a to ensure that third movable pawl 2024 is always stably supported by the third support portion 2122 when rotating. The fourth support portion 2132 penetrates through the fourth rotation hole 2025a to ensure that the fourth movable pawl 2025 is always stably supported by the fourth support portion 2132 when rotating.

In some embodiments of the present disclosure, the frame body 2011 is formed with a first receiving hole 2011a corresponding to the third support portion 2122 and a second receiving hole 2011b corresponding to the fourth support portion 2132. The third support portion 2122 is inserted into the first receiving hole 2011a to ensure that the third support shaft 212 is stably fixed onto the frame 201, and the fourth support portion 2132 is inserted into the second receiving hole 2011b to ensure that the fourth support shaft 213 is stably fixed onto the frame 201.

In some embodiments of the present disclosure, the first support portion 2072 has a diameter equal to a diameter of the first rotation hole 2022a to improve assembly of the first support portion 2072 with the first rotation hole 2022a, so that the stability of the rotation of the first movable pawl 2022 relative to the first support portion 2072 can be ensured. The second support portion 2082 has a diameter equal to a diameter of the second rotation hole 2023a to improve assembly of the second support portion 2082 with the second rotation hole 2023a, so that the stability of the rotation of the second movable pawl 2023 relative to the second support portion 2082 can be ensured.

The third support portion 2122 has a diameter equal to a diameter of the third rotation hole 2024a to improve assembly of the third support portion 2122 with the third rotation hole 2024a, so that the stability of the rotation of the third movable pawl 2024 relative to the third support portion 2122 can be ensured. The fourth support portion 2132 has a diameter equal to a diameter of the fourth rotation hole 2025a to improve assembly of the fourth support portion 2132 with the fourth rotation hole 2025a, so that the stability of the rotation of the fourth movable pawl 2025 relative to the fourth support portion 2132 can be ensured.

An end of the first support portion 2072 away from the first fix portion 2071 has a rounding structure to facilitate fitting the first support portion 2072 into the first rotation hole 2022a. An end of the second support portion 2082 away from the second fix portion 2081 has a rounding structure to facilitate fitting the second support portion 2082 into the second rotation hole 2023a.

An end of the third support portion 2122 away from the third fix portion 2121 has a rounding structure to facilitate fitting the third support portion 2122 into the third rotation hole 2024a. An end of the fourth support portion 2132 away from the fourth fix portion 2131 has a rounding structure to facilitate fitting the fourth support portion 2132 into the fourth rotation hole 2025a.

In some embodiments of the present disclosure, an end of the first fix portion 2071 away from the first support portion 2072 is flush with the outer wall surface of the mounting housing 10, and an end of the second fix portion 2081 away from the second support portion 2082 is flush with the outer wall surface of the mounting housing 10. An end of the third fix portion 2121 away from the third support portion 2122 is flush with a plate surface of the first support plate 2012, and an end of the fourth fix portion 2131 away from the fourth support portion 2132 is flush with a plate surface of the second support plate 2013. With such structure, an overall aesthetics of the camera lens 100 can be maintained.

In some embodiments of the present disclosure, the mounting housing 10 is formed with a first limit slot 10b surrounding the first fix portion 2071 and a second limit slot 10 caurrounding the second fix portion 2081. The first support plate 2012 is formed with a third limit slot 2012a surrounding the third fix portion 2121, and the second support plate 2013 is formed with a fourth limit slot 2013a surrounding the fourth fix portion 2131.

Referring to FIG. 2, FIG. 6 and FIG. 8, in the present disclosure, the lens module 30 can include a lens 301, a lens holder 302, an infrared filter 303, a support base 304, an imaging sensor 305, and a focusing circuit board 306. The lens holder 302 is accommodated within the frame 201. The lens 301 maintains relatively stable with the lens holder 302 through a threaded connection. The infrared filter 303 is located at an imaging side of the lens 301. The support base 304 is accommodated within the frame 201 and is configured to fix the infrared filter 303. The imaging sensor 305 is arranged corresponding to the infrared filter 303. The focusing circuit board 306 is electrically connected with the imaging sensor 305 to transmit an imaging signal.

The camera lens 100 can further include a shell 41 for covering the mounting housing 10 and a bottom plate 42 for closing the shell 41.

Various technical features of the above embodiments can be combined in any forms. All possible combinations of the various technical features in the above embodiments are not described for the purpose of concise description. However, these technical features should be considered to be fallen within the scope of the present disclosure without confliction therebetween.

The above embodiments are described in detail, and they are merely some of implementations of the present disclosure and should not be interpreted as limiting the scope of the present disclosure. It should be noted that those skilled in the art may made any modifications and improvements without departing from the concept of the present disclosure, and these are all fallen within the scope of the present disclosure. Therefore, the scope of the present disclosure should be defined by the appended claims.

What is claimed is:

1. A camera lens comprising:
   a mounting housing;
   a lens module accommodated within the mounting housing;
   an image stabilization module for driving the lens module to rotate;
   a first support shaft and a second support shaft that are fixed to the mounting housing opposite to each other along one of diagonals of the mounting housing; and a third support shaft and a fourth support shaft that are fixed to the frame opposite to each other along another one of the diagonals of the mounting housing, wherein the mounting housing is formed by sequentially connecting a first frame plate, a second frame plate, a third frame plate, and a fourth frame plate; and wherein the image stabilization module comprises:
a frame for accommodating the lens module;
a movable frame for movably suspending the frame in the mounting housing;
a first image stabilization coil fixed onto the first frame plate;
a second image stabilization coil fixed onto the second frame plate;
a first magnet fixed onto the frame relative to the first image stabilization coil; and
a second magnet fixed onto the frame relative to the second image stabilization coil;
wherein the movable frame has a first rotation hole, a second rotation hole, a third rotation hole, and a fourth rotation hole; and
wherein the first support shaft is rotatably fit within the first rotation hole and the second support shaft is rotatably fit within the second rotation hole in such a manner that the movable frame is rotatable along the one of the diagonals of the mounting housing; and
wherein the third support shaft is rotatably fit within the third rotation hole and the fourth support shaft is rotatably fit within the fourth rotation hole in such a manner that the frame is rotatable along the another one of the diagonals of the mounting housing.

2. The camera lens as described in claim 1, wherein the movable frame comprises a limit portion located at one end of the frame, and a first movable pawl, a second movable pawl, a third movable pawl, and a fourth movable pawl that are arranged around the limit portion,
wherein the first movable pawl and the second movable pawl are opposite to each other along one of the diagonals of the mounting housing, and the third movable pawl and the fourth movable pawl are opposite to each other along another one of the diagonals of the mounting housing; and
wherein the first rotation hole is provided in the first movable pawl, the second rotation hole is provided in the second movable pawl, the third rotation hole is provided in the third movable pawl, and the fourth rotation hole is provided in the fourth movable pawl.

3. The camera lens as described in claim 2, wherein the frame comprises a frame body, and a first support plate and a second support plate that are spaced apart from an outer wall of the frame body;
wherein the third support shaft is fixed to the first support plate, and the third movable pawl is disposed between the outer wall of the frame body and the first support plate; and
wherein the fourth support shaft is fixed to the second support plate, and the fourth movable pawl is disposed between the outer wall of the frame body and the second support plate.

4. The camera lens as described in claim 3, wherein the first support shaft comprises a first fix portion fixed to the mounting housing and a first support portion received within the first rotation hole, wherein the first fix portion is arranged coaxially with the first support portion and has a radius greater than a radius of the first rotation hole;
wherein the second support shaft comprises a second fix portion fixed to the mounting housing and a second support portion received within the second rotation hole, wherein the second fix portion is arranged coaxially with the second support portion and has a radius greater than a radius of the second rotation hole,
wherein the third support shaft comprises a third fix portion fixed to the first support plate and a third support portion received within the third rotation hole, wherein the third fix portion is arranged coaxially with the third support portion and has a radius greater than a radius of the third rotation hole; and
wherein the fourth support shaft comprises a fourth fix portion fixed to the second support plate and a fourth support portion received within the fourth rotation hole, wherein the fourth fix portion is arranged coaxially with the fourth support portion and has a radius greater than a radius of the fourth rotation hole.

5. The camera lens as described in claim 4, wherein an end of the first fix portion close to the first movable pawl protrudes from the mounting housing, and an end of the second fix portion close to the second movable pawl protrudes from the mounting housing; and
wherein an end of the third fix portion close to the third movable pawl protrudes from the first support plate, and an end of the fourth fix portion close to the fourth movable pawl protrudes from the second support plate.

6. The camera lens as described in claim 5, wherein the first movable pawl is spaced apart from the first fix portion, and the second movable pawl is spaced apart from the second fix portion; and
wherein the third movable pawl is spaced apart from each of the third fix portion and the outer wall of the frame body, and the fourth movable pawl is spaced apart from each of the fourth fix portion and the outer wall of the frame body.

7. The camera lens as described in claim 6, wherein the first support portion has a central axis coincident with a central axis of the second support portion, and the third support portion has a central axis coincident with a central axis of the fourth support portion.

8. The camera lens as described in claim 7, wherein the first support portion penetrates through the first rotation hole, the second support portion penetrates through the second rotation hole, the third support portion penetrates through the third rotation hole, and the fourth support portion penetrates through the fourth rotation hole.

9. The camera lens as described in claim 8, wherein a first receiving hole corresponding to the third support portion and a second receiving hole corresponding to the fourth support portion are provided in the frame body, the third support portion is inserted into the first receiving hole, and the fourth support portion is inserted into the second receiving hole.

10. The camera lens as described in claim 4, wherein the first support portion has a diameter equal to a diameter of the first rotation hole, the second support portion has a diameter equal to a diameter of the second rotation hole, the third support portion has a diameter equal to a diameter of the third rotation hole, and the fourth support portion has a diameter equal to a diameter of the fourth rotation hole.

* * * * *